HIGH SPEED ANTISTATIC MAGNETIC MEMBER

Filed Dec. 19, 1962

INVENTOR
ROBERT S. HAINES
BY George O. Saile
ATTORNEY

United States Patent Office 3,293,066

Patented Dec. 20, 1966

3,293,066

HIGH SPEED ANTISTATIC MAGNETIC MEMBER

Robert S. Haines, Poughkeepsie, N.Y., assignor to International Business Machines Corporation, New York, N.Y., a corporation of New York Filed Dec. 19, 1962, Ser. No. 245,837
7 Claims. (Cl. 117—68)

Figure 1:
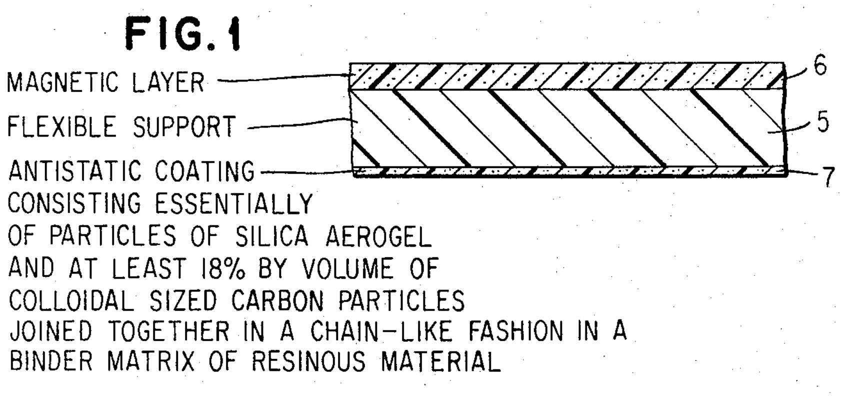

This invention relates to a magnetic record member in the form of a tape, ribbon, strip, continuous loop or the like which is useful as a storage medium for recording and reproducing digital information while the member is moving at high speed.

Magnetic record members in the form of a tape, ribbon, strip and the like are used as mediums for storing information as discrete areas of magnetization. The maximum writing and reading speeds have been, until the present, at a relatively low value. One of the problems of increasing writing and reading speeds over 200 inches per second is the detrimental build-up of static electricity on the magnetic record member which causes errors when the charges discharge through the read-write circuitry.

The problem may be illustrated by considering the common magnetic recording tape as the magnetic record member in the storage of digital information. The memory bank in digital computers generally utilizes a reel-to-reel magnetic tape recorder because of its ease of read and write, high information density and large storage capacity, and reasonably rapid access to the desired data. The reel-to-reel magnetic tape recorder has a reel on either side of the read-write magnetic head. A high speed digital tape shuttling mechanism is associated with the magnetic head for scanning the tape in search of the desired information as located by an address system. These mechanisms cause the tape to go from standstill to full reading or writing speed within a few milliseconds from reception of the "go" signal, and come to a dead stop in a few milliseconds from the arrival of the "stop" signal. If required by the computing system, the tape will automatically be repeatedly rescanned in the area of the desired block of data until the information has been fully utilized by the computer system. This rescanning requires the tape to go from standstill to full reading speed at the beginning of the data, to come to a dead stop at the end of the data, followed by a restart in the opposite direction to the beginning of the desired data block, a stop and again repeating of the entire cycle rescanning the data block until the information is no longer required. A vacuum buffering means is used between the shuttling mechanism and the spooling mechanism to permit the tape to be supplied and collected to satisfy the near instantaneous high speed start and stop demands without creating excessive stress and strain on the tape itself.

Present day digital magnetic tape recorders of the reel-to-reel type have used maximum read-write tape speeds up to 150 inches per second. An increase of these tape speeds would, of course, give the ability to write at a higher speed and to provide a more rapid access to the desired data. However, the higher shuttling speeds of the magnetic tape passing from reel to reel over the magnetic head causes an increased build-up of static electricity on the tape, as described above, which is detrimental to the digital recording system.

The amount of static electricity developed at maximum read-write tape speeds upwards of 200 inches per second is too great to be discharged by mere grounding of the tape drive components, or putting conductive materials in the magnetic coating itself. Metal coatings, such as aluminum, were tried on the side of the tape base opposite to the magnetic coating. The metallic coatings were subject to undue wear at these high tape speeds to the extent that this technique proved of little value.

It is thus an object of the present invention to provide a digital magnetic record member that is suitable for high read-write speeds.

It is a further object of this invention to provide a magnetic record member which prevents the build-up of static electricity on the record member at high read-write speeds.

It is a still further object of the invention to provide an antistatic coating having excellent wear properties and a satisfactory coefficient of friction, so that start and stop times can be held to a bare minimum, which may be applied to the side of a magnetic record member opposite to the magnetic coating to alleviate the build-up of static electricity on the record member.

These and other objects are accomplished in accordance with the broad aspects of the present invention by providing a magnetic record member having a flexible support with a magnetic coating on one side of the support and an antistatic coating on the opposite side of the support. The antistatic coating prevents the detrimental build-up of static electricity when the magnetic tape is run at speeds of greater than about 200 inches per second. The antistatic coating is composed of conductive material which has the property of discharging static electricity as it is developed. The coating is designed to have excellent wear characteristics and a similar coefficient of friction in both its dynamic and static conditions in order that the start and stop times of the record member is measured in a few milliseconds.

Figure 2:
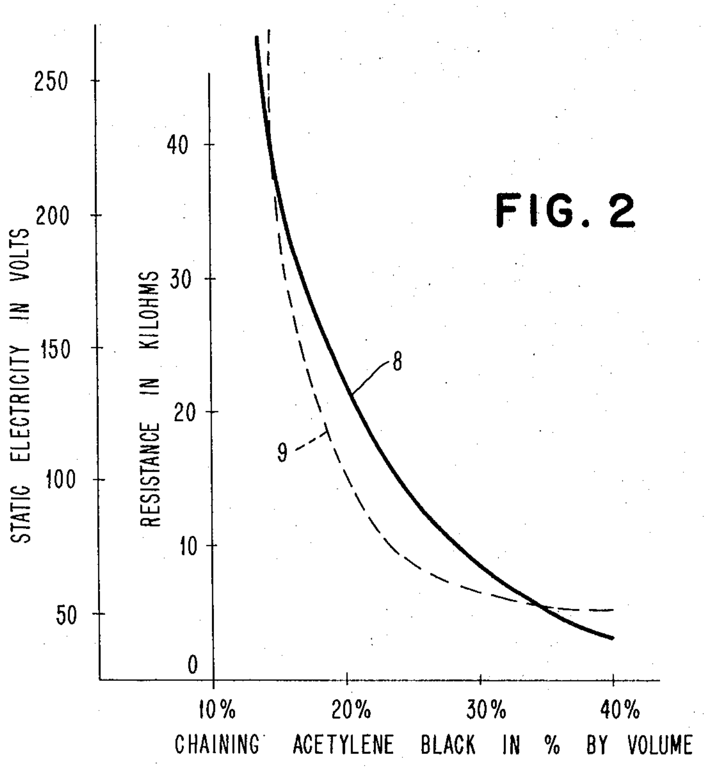

The foregoing and other objects, features and advantages of the invention will be apparent from the following more particular description of the preferred embodiment of the invention, as illustrated in the accompanying drawings:

In the drawings:

FIGURE 1 is a sectional view of one possible form of the high read-write speed digital magnetic record member of the present invention; and FIGURE 2 is a graphical representation illustrating certain electrical properties of a magnetic record member as varied by the conductivity of the antistatic coating.

Referring now, more particularly, to FIGURE 1, there is shown a digital magnetic record member composed of three layers. The thin flexible support 5 can be of any desired material but is usually a synthetic resinous material. The illustrated magnetic layer 6 is a uniform mixture of plastic binder and magnetic particles. The magnetic layer 6 could, alternatively, be a magnetizable layer of metal or alloy as described and claimed by John W. Wenner in copending United States patent application Ser. No. 124,498, filed July 17, 1961, now U.S. Patent 3,150,939, issued Sept. 29, 1964. The layer 7 on the opposite side of the flexible support 5 from the magnetic layer 6 is an antistatic coating. The antistatic layer 7 is preferably a chaining acetylene black particle dispersion within a suitable binder. Where it is necessary to modify the coefficient of friction of the antistatic coating, silica aerogel is dispersed throughout the antistatic coating.

Any binder material which is chemically stable and free of sticking at adverse temperature and humidity conditions, and has good adhesion to the flexible support together with a relatively low coefficient of friction is usable. Terephthalate acid polyesters as a group provide these necessary properties for a binder material where polyethylene terephthalate film, such as "Mylar" (a trademark of E. I. du Pont de Nemours and Company for a polyethylene terephthalate resin), is utilized as the flexible support. Where other supports are used; such as, cellulose triacetate, polycarbonates, etc., films; other binder materials having superior adherence properties to that particular support may be used as the binder constituent of the antistatic coating. The conventional technique of an adhesive precoating between the support and the antistatic coating may be used where extreme adhesion problems are encountered.

The conductive particles uniformly dispersed in the binder of the antistatic coating are chaining acetylene black. The black is like a carbon black in that it is composed of colloidal sized particles of carbon, however, it is unlike other carbon blacks because its particles are joined together in a chain-like fashion. The chain-like carbon black is made by the continuous thermal decomposition of acetylene at temperatures above 1500° C. with the temperature being maintained by the exothermic reaction occurring.

FIGURE 2 illustrates the change of resistance and static electricity build-up with volume increase of chaining acetylene black in a polyethylene terephthalate binder system. The resistance measurements were made on magnetic tapes containing various chaining acetylene black concentrations according to standard procedures with an ohmmeter. The static electricity in volts was measured on these magnetic tapes having the different chaining black concentrations by use of an electrometer during reading operations of a reel-to-reel magnetic tape recorder. The magnetic tape was moved past the tape head at a maximum read-write tape speed of 235 inches per second. The storage density of the gamma ferric oxide magnetic layer of the tape was 3000 bits per inch. The curve marked 8 illustrates the change in resistance in kilohms versus the change in volume concentration of chaining acetylene black. The curve designated as 9 shows the build-up of static electricity in volts as it is altered by the volume concentration of the acetylene black. It is seen from the curve 9 that the static electricity build-up is maintained at a relatively low level where greater than about 18% acetylene black by volume is used and by curve 8 that the resistance of the magnetic film increases rapidly with reduced acetylene black content in the antistatic coating. The optimum concentration of chaining acetylene black in the binder is within the range of approximately 18% to 35% by volume.

If the magnetic record member is to be used, where starting and stopping of the high speed tape is required, the antistatic coating must have a relatively high coefficient of friction. The chaining acetylene black particles in a synthetic resinous binder material does not have an optimum coefficient of friction for millisecond start and stop times where maximum read-write speeds are at high values. A hard material of fine particle size and with the ability to retain its high coefficient of friction in a synthetic resinous binder media over long periods of passing over frictional surfaces is required. One such material is silica aerogel. No silica aerogel would be added to the antistatic coating where the lowest possible coefficient of friction is desired. However, when increased friction is needed, a balance of the coefficient of friction with the conductivity of the antistatic back coating can be obtained to produce an optimum antistatic coating formulation for the desired use.

A magnetic record member of the type shown in FIGURE 1 is produced according to the following general procedure. A fine dispersion of chaining acetylene black and, if required, silica aerogel in a suitable binder material solution is made using an attritor. The mixture is then filtered through fine micron filters to remove any particles greater than five microns. The antistatic coating is then applied by conventional coating means to a thoroughly cleaned flexible support. The binder is then completely cured at an elevated temperature. A magnetic layer is then applied to the side of the support opposite to the antistatic coating. If the magnetic layer is a magnetic oxide coating it may be of any desired composition, such as that of the United States Patent No. 2,989,415, issued to Paul V. Horton and Robert S. Haines, June 20, 1961. The magnetic oxide coating is uniformly mixed, filtered, applied to the side of the film base opposite to the antistatic coated layer and cured at an elevated temperature such as disclosed by the United States Patent No. 2,989,415. Alternately, a metal magnetizable layer may be applied to the flexible support. Such a layer could be applied according to the disclosure and claims of the copending United States patent application of G. W. Greene et al., Ser. No. 170,141, filed Jan. 31, 1962. The layered article can then be slit into the desired record member configuration.

The following are examples of the present invention in detail. The examples are included merely to aid in the understanding of the invention and variations may be made by one skilled in the art without departing from the spirit and scope of the invention.

*Example 1*

A linear polyester resin was made according to the general melt polymerization technique from the following constituents:

TABLE A

| | Parts by weight |
|---|---|
| Dimethyl orthophthalate | 4.0 |
| Dimethyl isophthalate | 20.0 |
| Dimethyl terephthalate | 9.0 |
| Ethylene glycol | 23.6 |
| Calcium acetate | 0.050 |
| Antimony trioxide | 0.016 |

The dimethyl isophthalate, dimethyl terephthalate, and ethylene glycol together with calcium acetate and antimony trioxide catalysts were placed in a reaction vessel provided with distillation and agitation means. A blanket of nitrogen was introduced and the charge heated at atmospheric pressure and at a temperature of 380° F., with agitation, for a period of three hours. At this time, an additional four parts by weight of dimethyl orthophthalate were added to the reaction and heat was continued at 380° F. for another 1½ hours, with agitation, under the nitrogen atmosphere.

By this time, the evolution of the methanol during the ester-interchange reaction was completed. The temperature was increased to 440° F. and the pressure was reduced to a vacuum of 0.5 millimeter of mercury. The heating of the resulting esters was continued in the presence of the condensation catalysts for an additional 4½ hours. This heating removed the excess ethylene glycol as a distillate and the resulting polyesters had the desired viscosity. The product was then cooled to room temperature.

An isocyanate prepolymer curing agent was made by mixing the following ingredients:

TABLE B

| | Parts by weight |
|---|---|
| Toluene 2,4 diisocyanate | 1.3 |
| Toluene 2,6 diisocyanate | 0.7 |
| 1,4 butandiol | 0.8 |

The reaction was allowed to proceed until seventy per cent of the toluene diisocyanate was reacted as determined by infra-red analysis of the intensity of the absorption band in the 2270 $cm.^{-1}$ region. The reaction was then quenched by dissolving 60 parts by weight of the isocyanate prepolymer in 40 parts by weight methyl isobutyl ketone.

An antistatic coating of the following constituents was attritored, filtered to take out all particles greater than five microns and coated to one ten-thousandths of an inch on a one thousandths of an inch "Mylar" film support by means of a gravure roller:

| | Parts by weight |
|---|---|
| Linear polyethylene terephthalate | 9.60 |
| Chaining acetylene black (Shawinigan acetylene black made by Shawinigan Chemicals Ltd. Montreal, Canada) | 4.65 |
| Silica aerogel (Santocel CX made by Monsanto Chemical Co.) | 3.65 |
| Isocyanate prepolymer (60% solids in methyl isobutyl ketone) | 1.36 |
| Para dioxane | 30.0 |
| Tetrahydrofuran | 37.5 |

Volume concentration of chaining acetylene black, 20.0%.
Volume concentration of silica aerogel, 14.6%.

The linear polyethylene terephthalate used was made from the constituents listed in Table A and according to the process described therewith. The isocyanate prepolymer was made from the constituents listed in Table B and according to the process described therewith. The coating was completely cured at approximately 200° F. A magnetic oxide coating including essentially a dispersion acicular gamma ferric oxide particles in a butadiene acrylonitrile copolymer blended with a phenol resorcinol aldehyde resin plus the necessary wetting, curing and lubricating agents was then coated upon the surface of the "Mylar" opposite to the antistatic coating. The coating was cured at approximately 200° F. The antistatic and magnetic coatings were simultaneously calendered at a hydraulic pressure of 16,000 pounds and temperature of 120°–140° F. The coated "Mylar" was slit into magnetic tapes of 1¾ inches in width.

The magnetic tape was tested under actual high speed conditions of a reel-to-reel magnetic tape recorder having a maximum read-write speed of 235 inches per second and bit density of 3000 bits per inch. Static electricity was measured on an electrometer as the tape was reeling on and off one of the reeling spools to the magnetic head. There was a static electricity build-up which approached 100 volts under the most extreme conditions. Starting and stopping were satisfactory and wear of the backing coating was excellent over long periods of time. The static electricity build-up was considered not objectionable since there was no detrimental discharge through the read-write cricuitry.

*Example 2*

An antistatic coating of the following constituents was attritored, filtered to take out all particules greater than five microns and coated to one tent-housandths of an inch on a one thousandths of an inch "Mylar" film support by means of a gravure roller:

| | Parts by weight |
|---|---|
| Linear polyethylene terephthalate | 9.60 |
| Chaining acetylene black (Shawinigan acetylene black made by Shawinigan Chemicals Ltd. Montreal, Canada) | 4.6 |
| Silica aerogel (Santocel CX made by Monsanto Chemical Co.) | 2.22 |
| Isocyanate prepolymer (60% solids in methyl isobutyl ketone) | 1.36 |
| Para dioxane | 30.0 |
| Tetrahydrofuran | 37.5 |

Volume concentration of chaining acetylene black, 21.3%.
Volume concentration of silica areogel, 9.5%

The linear polyethylene terephthalate and iscyanate prepolymer were made as described in Example 1. The antistatic coating was cured at approximately 200° F. The magnetic oxide coating was of the same composition and applied according to the same procedure as that of Example 1. The record member was calendered and slit to size. The tape was tested as described in Example 1 and proved to have a maximum static electricity build-up of approximately 80 volts. The starting and stopping were effected at millisecond intervals. There was no noticeable tape wear.

*Example 3*

An antistatic coating of the following ingredients was applied to one side of a "Mylar" support film and a magnetic oxide coating applied to the opposite side of the support film according to the procedure of Example 1:

| | Parts by weight |
|---|---|
| Linear polyethylene terephthalate | 9.60 |
| Chaining acetylene black (Shawinigan acetylene black made by Shawinigan Chemicals Ltd. Montreal, Canada) | 5.2 |
| Silica aerogel (Santocel CX made by Monsanto Chemical Co.) | 1.15 |
| Isocyanate prepolymer (60% solids in methyl isobutyl ketone) | 1.36 |
| Para dioxane | 33.2 |
| Tetrahydrofuran | 31.75 |

Volume concentration of acetylene black 24.0%
Volume concentration of silica aerogel, 5.0%.

The linear polyethylene terephthalate and isocyanate prepolymer were made according to the procedure of Example 1. The record member was calendered and slit to size. The tape was tested as described in Example 1 and proved to have a maximum static electricity build-up of approximately 70 volts. The magnetic tape took longer to reach the maximum read-write speed of 235 inches per second in starting and longer to come to a dead stop from the maximum speed. There was no noticeable tape wear.

*Example 4*

An antistatic coating of the following ingredients was applied to one side of a "Mylar" support film and a magnetic oxide coating applied to the opposite side of the support film according to the procedure of Example 1:

| | Parts by weight |
|---|---|
| Linear polyethylene terephthalate | 11.6 |
| Chaining acetylene black (Shawinigan acetylene black made by Shawinigan Chemicals Ltd., Montreal, Canada) | 4.6 |
| Isocyanate prepolymer (60% solids in methyl isobutyl ketone) | 1.85 |
| Para dioxane | 30.0 |
| Tetrahydrofuran | 34.0 |

Volume concentration of chaining acetylene black, 20.0%.

The linear polyethylene terephthalate and isocyanate prepolymer were made according to the procedure in Example 1. The record member was calendered and slit to size. The tape was tested as described in Example 1 and proved to have a maximum static electricity build-up of approximately 100 volts. The magnetic tape took much longer to reach the maximum read-write speed of 235 inches per second and longer to come to a dead stop from the maximum speed than the tapes made with an amount of silica aerogel included in their formulation in Examples 1, 2 and 3. There was no noticeable tape wear.

*Example 5*

An antistatic coating of the following ingredients was applied to one side of a "Mylar" support film and a magnetic oxide coating applied to the opposite side of the support film according to the procedure of Example 1:

| | Parts by weight |
|---|---|
| Linear polyethylene terephthalate | 9.6 |
| Chaining acetylene black (Shawinigan acetylene black made by Shawinigan Chemicals Ltd., Montreal, Canada) | 5.2 |
| Isocyanate prepolymer | 1.36 |
| Para dioxane | 33.2 |
| Tetrahydrofuran | 28.5 |

Volume concentration of chaining acetylene black, 25.2%.

The linear polyethylene terephthalate and isocyanate prepolymer were made according to the procedure of Example 1. The record member was calendered and slit to size. The tape was tested as described in Example 1 and proved to have a maximum static electricity build-up of approximately 60 volts. The magnetic tape took much longer to reach the maximum read-write speed of 235 inches per second and longer to come to a dead stop from the maximum speed than any of the tapes made with an amount of silica aerogel included in their formulation in Examples 1, 2 and 3. There was no noticeable tape wear.

The invention thus provides a digital magnetic record member which prevents the build-up of static electricity even at high read-write speeds. Further, magnetic record members of the present invention have been used over long periods of time without noticeable wear. The antistatic coating may be formulated to give optimum start-stop characteristics depending upon the particular type of record member to be used. When the record member is in the form of an elongated magnetic tape and millisecond starts and stops are desirable, an increased coefficient of friction is obtainable by addition of quantities of silica aerogel. Alternatively, when a lower coefficient of friction is desirable, as in the case of a magnetic strip, the quantity of silica aerogel is reduced or taken completely out of the formulation.

While this invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic record member comprising:
   a flexible nonmagnetic support having two faces;
   a magnetic layer covering one face of the support; and a wear resistant antistatic coating having good frictional characteristics adherently bonded to the second face of the support, said antistatic coating consisting essentially of particles of silica aerogel and colloidal sized particles of carbon joined together in a chain-like fashion, said colloidal sized carbon particles constituting at least about 18% by volume of the antistatic coating, said particles of silica aerogel and colloidal sized carbon uniformly dispersed in a binder matrix of resinous material.

2. The article of claim 1 wherein the carbon particles are chaining acetylene black.

3. The article of claim 1 wherein the carbon particles constitute about 18 to about 35% by volume of the antistatic coating.

4. The article of claim 1 wherein the binder matrix of the antistatic coating is a cured linear polyethylene terephthalate.

5. The article of claim 1 wherein the magnetic layer is a dispersion of particulate magnetic material in a binder matrix.

6. The article of claim 1 wherein the magnetic layer is selected from the group consisting of magnetic metal and alloy.

7. The article of claim 1 wherein the support is polyethylene terephthalate.

References Cited by the Examiner

UNITED STATES PATENTS

| | | | |
|---|---|---|---|
| 2,643,048 | 6/1953 | Wilson | 229—53 |
| 2,803,566 | 8/1957 | Smith-Johannsen | 117—169 X |
| 2,804,401 | 8/1957 | Cousino | 117—138.8 |
| 2,887,462 | 5/1959 | Van Oot | 260—40 |
| 2,923,642 | 2/1960 | Hausen | 117—68 |
| 2,997,451 | 8/1961 | Miller | 260—41 |
| 3,007,892 | 11/1961 | Gruschke et al. | 260—40 |
| 3,041,196 | 6/1962 | Stella | 117—43 |
| 3,115,420 | 12/1963 | Centa et al. | 117—68 |
| 3,166,688 | 1/1965 | Rowand et al. | 317—2 |

FOREIGN PATENTS

| | | |
|---|---|---|
| 1,083,561 | 6/1960 | Germany. |

WILLIAM D. MARTIN, *Primary Examiner.*

RICHARD D. NEVIUS, *Examiner.*

H. C. COLE, W. D. HERRICK, *Assistant Examiners.*